UNITED STATES PATENT OFFICE.

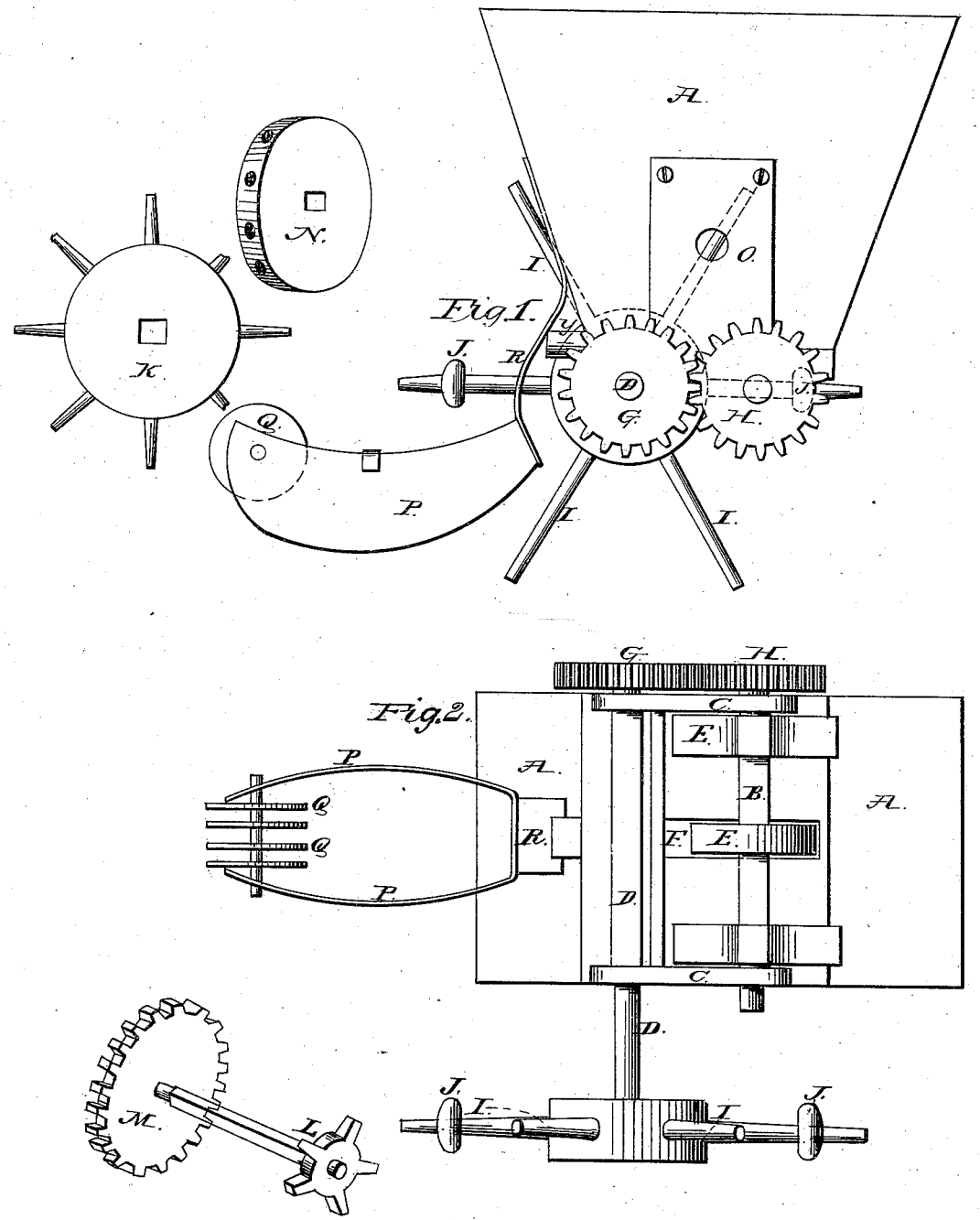

WILLIAM C. WALKER, OF GLASGOW, KENTUCKY.

IMPROVEMENT IN SEED PLANTERS AND DRILLS.

Specification forming part of Letters Patent No. 169,750, dated November 9, 1875; application filed April 21, 1875.

*To all whom it may concern:*

Be it known that I, WILLIAM C. WALKER, of Glasgow, in the county of Barren and State of Kentucky, have invented a new and Improved Combined Corn and Cotton Planter and Seed-Drill; and I do declare the following to be a full, clear, and exact description of the same, reference being had to the accompanying drawing forming part of this specification, in which—

Figure 1 is a side view of the invention. Fig. 2 is a plan view, showing the bottom of the seed-box, gearing, and shafts, &c.

The letters of reference in the accompanying drawings denote the same parts.

The object of this invention is to provide a planter which can be readily adjusted to any ordinary plow, harrow, or other implement, and for marking off the ground, so as to meet the requirements in planting corn in checks both ways, or in drills, or in drilling cottonseed, broom-corn, millet, or other seed; and it consists in the peculiar construction and arrangement of its parts, which I will now proceed to describe.

In the drawings, A represents the seed-box, which is designed to attach by bolts or other means to the beam, immediately in rear of any plow, or to any harrow or cultivator by providing a horizontal cross-section or beam running through it. On the bottom of the seed-box is journaled the shaft B. On this shaft is also the bearings C C, in which is journaled the shaft D, at the other end of said bearings or frame C C. In the bottom of the seed-box is an opening across the middle of the shaft B, and at right angles to it on the shaft B; and revolving up into this opening is a wheel, E, with two similar orifices in its circumference or edge, one of them being shown at F, the other being opposite to it. These orifices are large enough to contain eight grains of corn, but are to be provided with movable false bottoms, held in by a screw or other device, so as to reduce the depth of these orifices until they will only contain two grains, and by removing one or more of said false bottoms any desired number may be dropped. Inside of the seed-box, and fastened to it, is a brush touching the circumference of the wheel E, and so arranged as, when the wheel is in motion, to prevent the escape of any seed only when the orifice F or its opposite passes under the brush.

Thus it will be seen that no seed could escape, except twice during each revolution of the wheel E, and then only the contents of the two orifices.

On one end of the parallel shafts B D are two cog-wheels, G H, of the same circumference. They derive motion from a driving-wheel, I, hung on the opposite end of the shaft D. This wheel is provided with radial arms about fifteen inches in length, or so as to make the wheel just eight feet in circumference. This wheel is hung in bearings in the movable frame C C. The length of this frame is the radius of a circle whose center is the shaft B and circumference the shaft D, and so arranged that the driving-wheel I may pass any rock or unevenness in the surface without raising the weight of the seed-box and plow, and thus regulating the depth the arms of the wheel I would enter the ground, without any regard being had to the depth the plow was running.

It is intended that the arms of the wheel I shall enter below the surface a few inches when the implement to which it is attached is used. Thus it will be seen when the plow or harrow has passed just eight feet in the proper direction the wheel I and shaft D will have made one revolution, and, consequently, imparted the same number of revolutions to the shaft B and wheel E, and discharged the contents of both the orifices on its circumference, thus dropping every four feet. So it will be seen if the dropping attachment is fixed at the end of each row to drop in the right place the wheel I will measure the distance, so as to drop exactly four feet apart and in rows both ways, unless, in passing a stump or other obstruction, it should get thrown out of line. In order to let that fact be known at any time, there is placed a marker on two of the radial arms of the wheel, as shown at J J. These are to be arranged so as to mark the spot on the surface opposite to where the hill of seed is dropped, and in the row at right angles with the direction the plow is moving, so that the dropping attachment may be regulated and set right at any time.

Now, should it be desired to drop at a less distance than four feet, it will only be necessary to have cog-wheels of unequal sizes to use in the place of the wheels G H. By placing the smaller one on the shaft B, it will increase the speed of said shaft, and consequently drop the contents of the orifices on the wheel E more than twice while the wheel I is making one revolution. Thus, by providing several sets of cog-wheels, all of different sizes, the distance may be regulated to any required number of feet or inches.

As above described, the machine is arranged for dropping corn. To convert it into a cotton-planter it is only necessary to take out the wheel E and put in its place the wheel K, which has a row of radial pins extending around its circumference, and will continually force out the seed. The extra sets of cog-wheels of unequal sizes may be used to regulate the amount of seed dropped per acre by increasing or diminishing the speed of the shaft B and wheel K. To prevent the cotton-seed from clogging or packing in the seed-box, there is an agitating wheel and shaft, L, with gearing-wheel M, which must be put so as to revolve over the wheel K, with bearings in the side of the seed-box, which are so arranged as to be easily raised or lowered, so as the wheel M will gear in any sized wheels which may be used on the shaft D.

In order to convert it into a drill for broom-corn, millet, &c., it is only necessary to remove the wheel K and put in its place the wheel N, which has a row of small orifices extending around its circumference, about two inches apart. When the wheel is in motion these orifices will discharge their contents after passing under the brush, thus making a continuous drill. The amount of seed dropped may be regulated by using the extra cog-wheels, same as for cotton.

Fastened to the seed-box, and for greater strength bolted to the beam or cross-section of the harrow, is a metal drag, P P, which is provided with a spring, R R, so as to pass over any obstruction, and arranged so as to pass immediately behind the plow, and opening in the bottom of the seed-box, one arm of the drag on each side of the furrow, so as to fill it up and cover the seed after it is dropped.

In case the ground is cloddy and rough, there are four or more metal wheels hung on a small shaft, with bearings in the ends of the arms P P. These wheels are shown at Fig. 2, and so arranged that their sharp edges, in rolling, will cut the clods and pulverize the surface over the seed, and at the same time not drag it out of place.

I claim—

1. The adjustable frame C C, constructed to form bearings for the shaft D, in combination with feed-wheel E, gears G H, and wheel I, and operating substantially as and for the purpose set forth.

2. The drag P P, secured to the hopper by a spring-arm, and provided with the cutting-disks Q Q, for covering the seed and pulverizing the soil, substantially as specified.

3. The shaft B, operated by the marking and driving wheel I, and carrying the feed-wheel E, said shaft also constituting a bearing for the adjustable frame C, substantially as specified.

WILLIAM C. WALKER.

Witnesses:
JAMES P. GARNETT,
R. B. EVANS.